Aug. 23, 1932.                H. KUGLER                 1,873,604
GUIDING MEANS FOR THE CARRIER PLATES IN MATCH MAKING MACHINES
Filed March 14, 1931

Inventor
Heinrich Kugler,
By Henry Orth Jr
atty.

Patented Aug. 23, 1932

1,873,604

UNITED STATES PATENT OFFICE

HEINRICH KUGLER, OF ZURICH, SWITZERLAND, ASSIGNOR TO JOHANN KESSLER AND GEORG FISCHER, OF ZURICH, SWITZERLAND

GUIDING MEANS FOR THE CARRIER PLATES IN MATCH-MAKING MACHINES

Application filed March 14, 1931, Serial No. 522,748, and in Germany October 11, 1930.

The carrier plates employed in match-making machines of the type described in the U. S. Patent Specification No. 1151680 issued August 31, 1915 serve for the reception of the splints and pass on their travel during the drying of the splints through rectilinear guides and rotatable guide members. The latter are of different diameters depending whether they receive the splints in radially outwardly or inwardly directed position. While in the former case the diameter of the rotatable guide member may be small with respect to the length of the splints, in the latter case, with inwardly directed splints, the diameter of the rotatable guide member is required to be larger in order that interfering of the splints of adjacent supporting plates, during their travel on the curved portions of their path is avoided. This requirement, however, necessitates machinery of considerably larger dimensions, so that the machines take up more space and are uneconomical. To overcome this drawback, it has been proposed to apply swinging guide members for the curved portions of the path of the matches to take the place of the large rotatable members, but this involved complicated driving means.

The object of the invention is to reduce the diameter of the rotatable guide members for receiving the carrier plates having their splints in inwardly directed position, and at the same time preventing the splints of adjacent carrier plates from interfering with each other.

According to the invention the spaces between the reduced ends of succeeding carrier plates are engaged by teeth of a greater width than the intervening spaces between the said reduced ends and which force the carrier plates apart during the movement of the latter over the rotatable guide members and therefore causing the teeth to move at greater velocity about the axis of the rotatable guide member than the carrier plates themselves are moved along the lateral guides prior to entering the rotatable member. Thus the carrier plates move further apart, suchwise, that even with a small diameter of the rotatable guide member the splints are prevented from interfering with each other.

Figure 1:
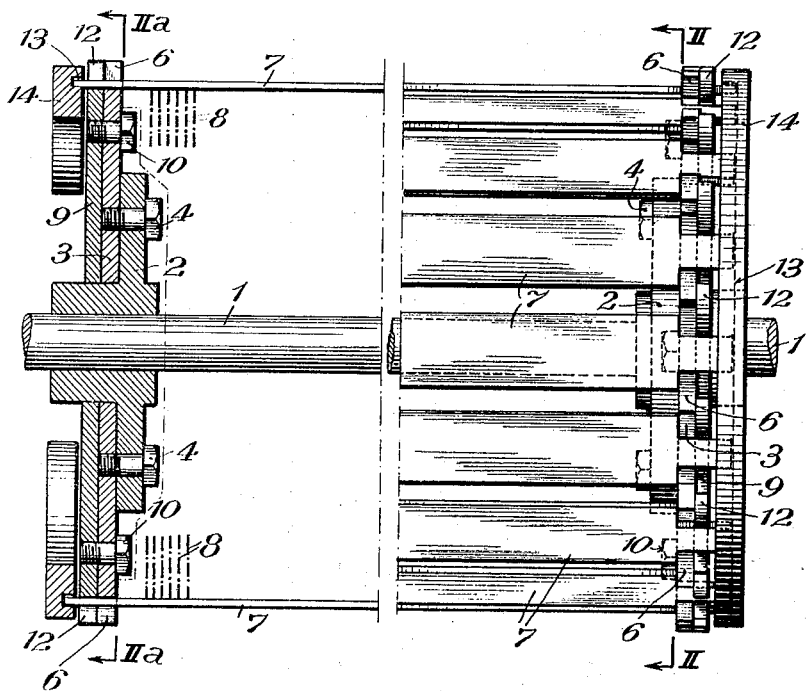
Figure 2:
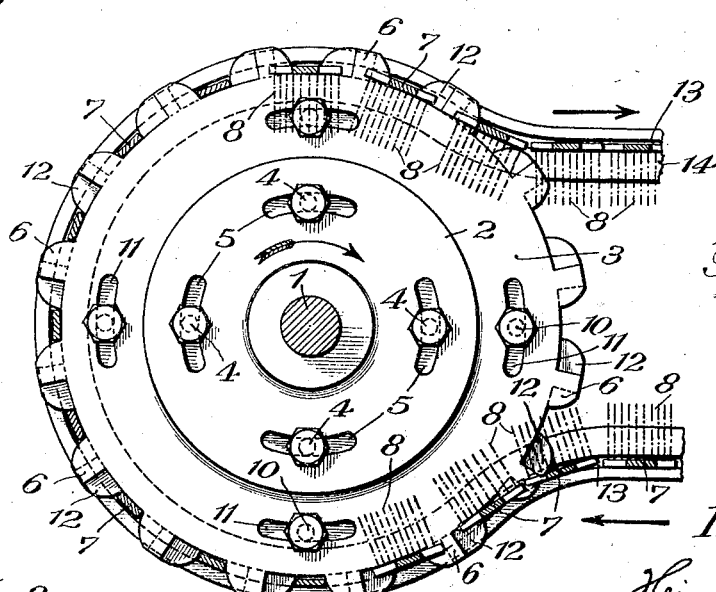
Figure 3:
Figure 4:
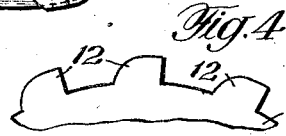

In the drawing a rotatable guide member for the splints with the latter directed radially inwardly is illustrated, by way of example only, in which Fig. 1 is an elevation, partly in section, and
Fig. 2 a view taken at right angles to Fig. 1, more particularly to the right in a section on the line II—II and to the left on the line IIa—IIa in said figure, whilst the
Figs. 3 and 4 show details.

The shaft 1 rotates the driving disc 2. On the hub of the driving disc 2 a conveyor disc 3 is circumferentially adjustably mounted and connected with the driving disc 2 by head screws 4 passed through slots 5 in the latter disc. The circumference of the conveyor disc 3 is provided with teeth 6 (Fig. 3) which for actuating the carrier bars 7 engage in the spaces between the reduced ends of succeeding carrier bars into which the splints 8 are forced so as to be radially inwardly directed when passing around the rotatable guide member comprising two conveyor discs 3 on the shaft 1. On the hub of the driving disc 2 is further mounted a spacing disc 9 which is adjustably connected with the conveyor disc 3 by head screws 10 extending through slots 11 formed in the conveyor disc 3. The spacing disc 9 is provided on its periphery with teeth 12, Fig. 4, the operative flanks of which are oppositely disposed to the driving flanks of the conveyor disc 3 and every tooth 12 being correlated to one of the teeth 6.

As shown in Fig. 2, the carrier plates passing through grooves 13 of the lateral guides 14 move on the underside of the guide member in engagement with the teeth 6 and 12 of the discs 3 and 9 respectively, as indicated by the arrows. The advancement of the carrier plate 7 with the splints radially outwardly directed through the next rotatable guide member of known construction provided in the guiding device, but not shown in the drawing, is effected with the carrier plates running at constant speed and without contacting each other. The advancement of the carrier plates through the rotatable member specified above which turns at greater speed than that of the carrier plates arriving from the straight guide portion is effected by the teeth 6 of the driving disc 3 gripping alternately behind successive plates 7; whilst the corresponding teeth 12 of the spacing disc 9 which are lagging behind the teeth 6 each time engage with the next following bar 7. In this manner the two adjacent reduced ends of bars 7 are held a distance apart which is equal to the total thickness of a pair of teeth 6 and 12 and the contour of the operative flank of the tooth 12 is such that the rearward carrier plate which is to be separated from the preceding plate 7 is prevented from moving up on the latter plate. After the carrier plates 7 have moved beyond reach of the rotatable member i. e. when they pass over to the rectilinear part of their guides 14, as shown in the upper portion of Fig. 2, the plates 7 close up again on one another, because after being disengaged from the tooth 6 the carrier plates come to rest until they are pushed ahead by the next following bar. Consequently the movement of the bars after their exit from the rotatable guide member shown is intermittent, the mean speed of the movement being equal to that with which the bars were moving prior to reaching the rotatable guide member.

The circumferentially adjustable connection between the discs 3 and 9 enables varying the width of the spaces between adjacent bars, so that in spite of the small diameter of the rotatable guide member the splints 8 are prevented from interfering with each other while passing said member. Readjustment of the distance of the carrier plates to the required width corresponding to the wear of the flanks of the teeth 6 and 12 is also rendered possible by shifting the discs 3 and 9 with respect to each other. By the adjustable connection between the associated discs 3 and 9 and the driving disc 2, the rotatable guide member is adapted to be adjusted according to the existing conditions, so that the teeth 6 and 12 of the discs 3 and 9 are at all times in a position to engage in the spaces between the reduced ends of the carrier plates free of shock while the bars are moving towards the teeth at constant speed. The rearward or operative flanks of the teeth 12 are so shaped that from the moment two adjacent carrier plates 7 begin to separate, an undesirable advance movement of the succeeding plate, which is to be held back until engaged by the next tooth 6, is prevented.

I claim:

1. In a guiding device for carrier plates in match-making machines, the combination with rectilinear guide sections for the carrier plates having reduced ends providing a space therebetween at each two adjacent carrier plates, of a rotatable guide member adjoining said rectilinear guide sections, circumferentially adjustable peripheral teeth provided on said rotatable guide member and cooperating with said spaces, means for adjusting the said teeth, and means for rotating said guide member at greater speed than that at which the carrier plates are moved towards said rotatable guide member.

2. In a guiding device for carrier plates in match-making machines, the combination with rectilinear guide sections for the carrier plates having reduced ends providing a space therebetween at each two adjacent carrier plates, of a rotatable guide member adjoining said rectilinear guide sections, two discs provided on said rotatable guide member in circumferentially adjustable relation and each carrying component parts of teeth, for cooperation with said spaces, means for adjusting said discs to vary the width of said teeth correspondingly to various distances between said carrier plates, and means for rotating said guide member at greater speed than that at which the carrier plates are moved towards said rotatable guide member.

3. In a guiding device for carrier plates in match-making machines, the combination with rectilinear guide sections for the carrier plates having reduced ends providing a space therebetween at each two adjacent carrier plates, of a rotatable guide member adjoining said rectilinear guide sections, a driving disc provided on said rotatable member, two discs provided on said rotatable guide member in circumferentially adjustable relation and each carrying component parts of teeth for cooperation with said spaces, means for adjusting said discs, connecting means between said two discs and said driving disc, adjusting means arranged between said toothed discs and said driving disc to circumferentially displace said toothed discs relatively to said driving disc, and means for rotating said driving disc at greater speed than that at which the carrier plates are moved towards said rotatable guide member.

4. In a guiding device for carrier plates in match-making machines, the combination with rectilinear guide sections for the carrier plates having reduced ends providing a space therebetween at each two adjacent carrier plates, of a rotatable guide member adjoining said rectilinear guide sections, two discs provided on said rotatable guide member in circumferentially adjustable relation and each carrying component parts of teeth for cooperation with said spaces, the driving flank of said teeth being carried by one of said discs and the rearward flank by the second disc, means for adjusting said discs, and means for rotating said guide member at greater speed than that at which the carrier plates are moved towards said rotatable guide member.

5. In a guiding device for carrier plates in match-making machines, the combination with rectilinear guide sections for the carrier plates having reduced ends providing a space therebetween at each two adjacent carrier plates, of a rotatable guide member adjoining said rectilinear guide sections, two discs provided on said rotatable guide member in circumferentially adjustable relation and each carrying component parts of teeth for cooperation with said spaces, the driving flank of said teeth being carried by one of said discs and the rearward flank by the second disc, said rearward flank being shaped to prevent the carrier plate cooperating therewith to move up on the preceding carrier plate, means for adjusting said discs, and means for rotating said guide member at greater speed than that at which the carrier plates are moved towards said rotatable guide member.

6. A spacing device for carrier plates of match-making machines, in which the ends of the plates are reduced to form openings between adjacent plates, a rotatable guide member, teeth on said guide member composed of two relatively adjustable component parts and adapted to enter said openings, the said guide member rotating at a greater speed than that at which the carrier plates are moved toward the said rotatable guide member.

In testimony whereof I have signed my name to this specification.

HEINRICH KUGLER.